Aug. 19, 1941.    W. E. VAN DORN    2,252,789
SUSPENSION SYSTEM FOR ARTICULATED VEHICLES
Original Filed March 7, 1938    4 Sheets-Sheet 2

Inventors.
William E. Van Dorn.
Paul K. Beemer.
Malcolm & Scantlebury
Attorneys.

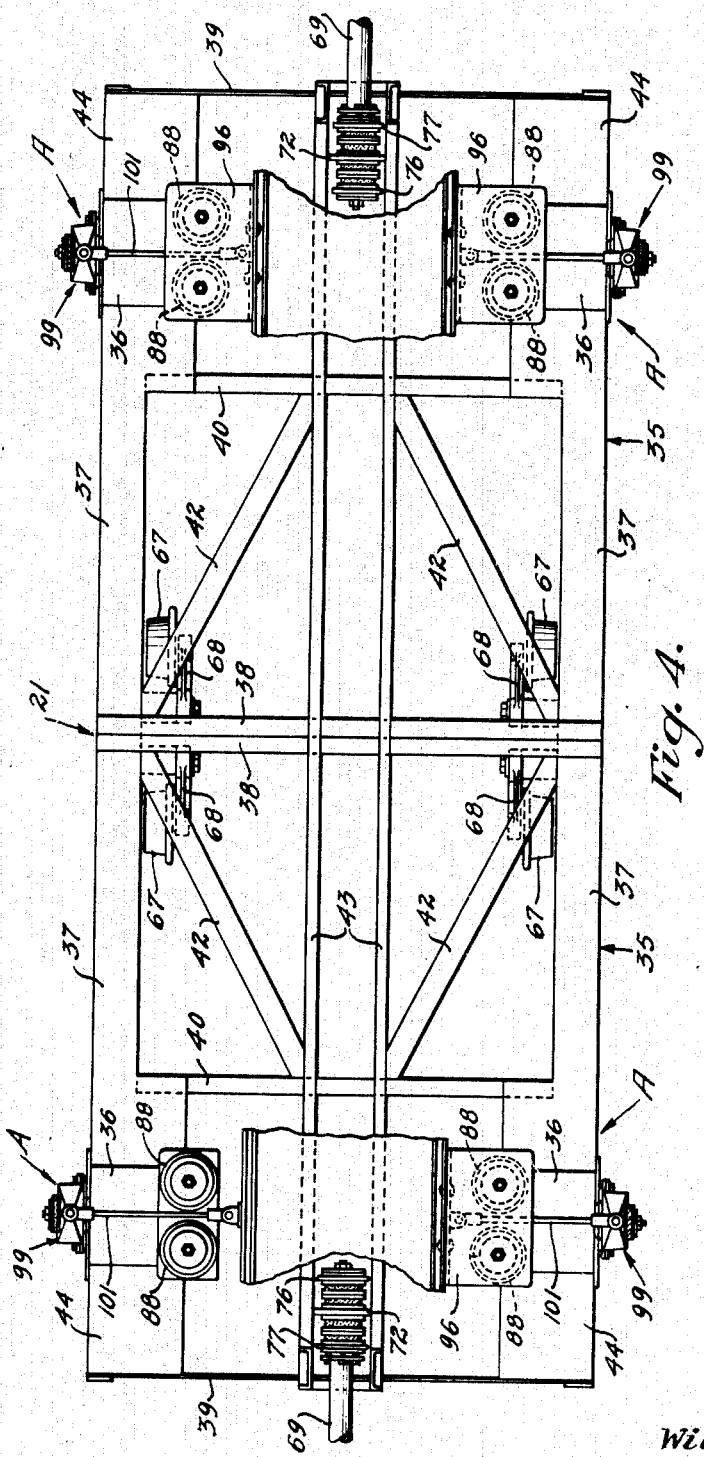

Aug. 19, 1941.  W. E. VAN DORN  2,252,789
SUSPENSION SYSTEM FOR ARTICULATED VEHICLES
Original Filed March 7, 1938  4 Sheets—Sheet 4
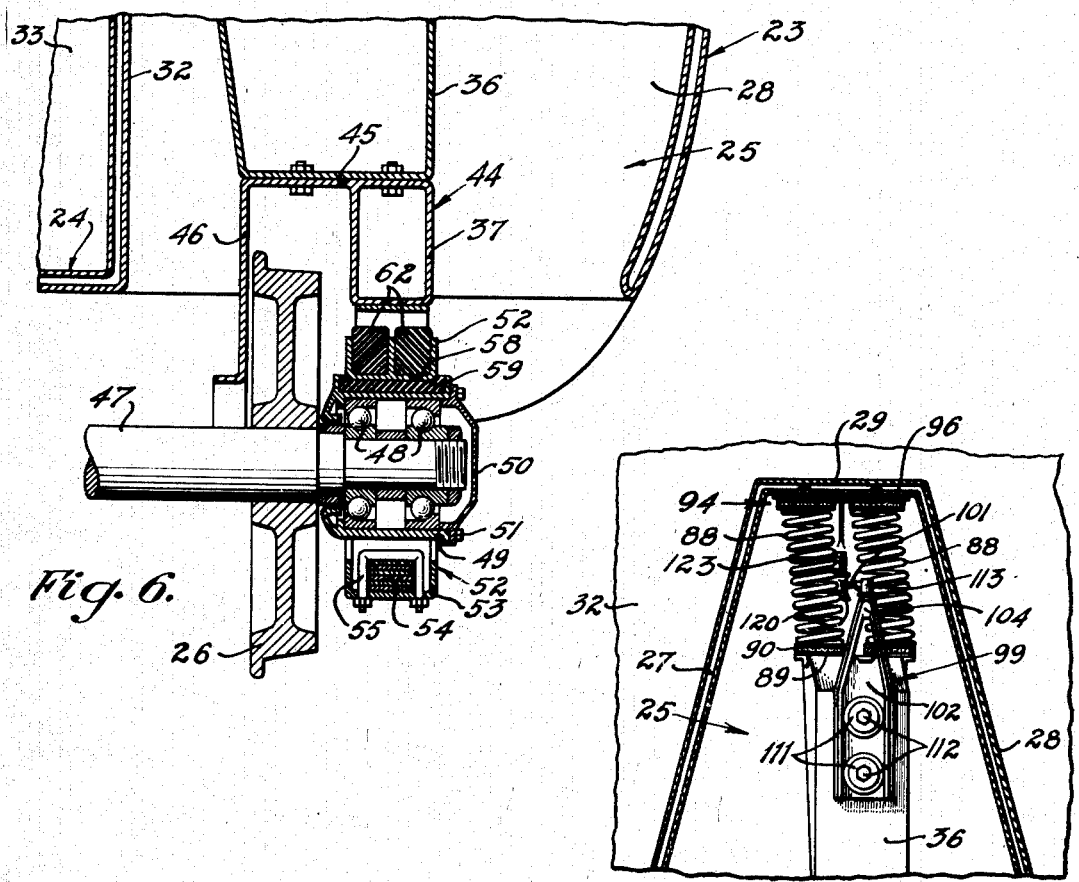
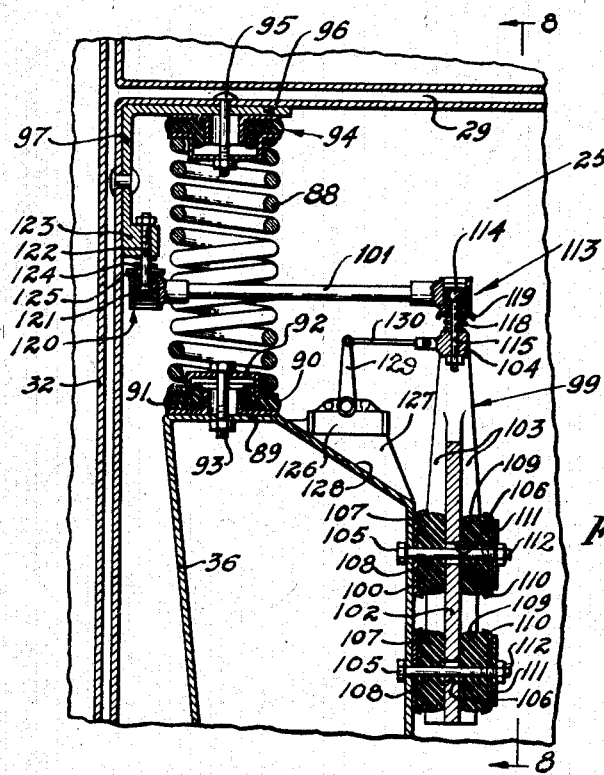
Fig. 6.
Fig. 8.
Fig. 7.
Inventors.
William E. Van Dorn.
Paul K. Beemer.
Attorneys.

Patented Aug. 19, 1941

2,252,789

UNITED STATES PATENT OFFICE 2,252,789

SUSPENSION SYSTEM FOR ARTICULATED VEHICLES

William E. Van Dorn, Pasadena, and Paul K. Beemer, Inglewood, Calif., assignors to Pacific Railway Equipment Company, Los Angeles, Calif., a corporation of California Original application March 7, 1938, Serial No. 194,260, now Patent No. 2,225,242, dated December 17, 1940. Divided and this application January 29, 1940, Serial No. 316,070

10 Claims. (Cl. 105—4)

This invention, in common with those disclosed in other patent applications which will be referred to, relates to suspension systems for vehicles. These inventions are generally applicable to various types of vehicles, and although specifically designed for application to railway vehicles and therefore illustratively described as applied to them, they are not limited to that particular application and use. And these inventions have two further adaptations and uses, one for suspension and control of vehicle bodies regardless of articulation, and the other for suspension, control and draft connection of articulated vehicle bodies. This present invention and application relate to the latter adaptation.

This present application is a division of the Van Dorn and Beemer application, Ser. No. 194,260, filed March 7, 1938, now matured as Patent No. 2,225,242, December 17, 1940. The subject-matter of said application is in certain respects that of improvement on the subject-matters of the previously filed Van Dorn applications Ser. No. 43,692, October 5, 1935 and Ser. No. 87,698, June 27, 1936. Copending Van Dorn applications Ser. No. 303,231 and Ser. No. 303,232 are continuations in part of said applications Ser. No. 43,692 and 87,698; Ser. No. 303,231 continuing in part the suspension subject matter of Ser. No. 43,692 without regard to articulation, and Ser. No. 303,232 continuing in part the subject matters of Ser. No. 43,692 and 87,698 with regard to articulation and draft interconnection of vehicle bodies. The subject-matter of this present application, an "articulation" division of Ser. No. 194,260, (Patent No. 2,225,242) therefore may be viewed as being, in certain respects, improvements upon the subject-matter of said "articulation" application, Ser. No. 303,232. The applications Ser. No. 303,231 and 303,232 have now matured, respectively, into Patents Nos. 2,217,033 and 2,217,034, both dated October 8, 1940.

The general objects of this group of inventions may be characterized, although not necessarily fully stated, by saying that they involve the provision of a system suspension and control, articulation and draft connection, which enables vehicle bodies, and particularly railway vehicles, to be hung at a level lower than that necessitated by present vehicle suspensions, which gives to the vehicle body a controlled oscillatory motion about a high level longitudinal axis rather than the tilting or rolling motion taken by present day vehicle bodies when subjected to lateral forces; and, in general, gives to such a vehicle body controlled motions and freedoms that result in higher safety and increased passenger comfort, and therefore enables higher speed to be attained even with lighter bodies on present-day roadbeds and within the present regulations and restrictions applied to railway rolling stock.

The group of inventions provides for hanging the vehicle body at a relatively low level, and with a relatively low center of gravity; and also, by the nature and action of its load-taking elements, and by its provision of lateral restraint, applied to the body at a high level, the invention provides for oscillatory swinging of the body about a high longitudinal axis above the center of gravity. This last mentioned provision causes the body to swing pendulously when subjected to any lateral thrusts, such as the lateral thrusts due to misalinement of trackage or centrifugal thrusts in rounding curves. The motion of the body under such thrusts is one of pendulous swinging or banking rather than that of tilting or rolling. The lateral restraints applied at the high level, as well as the high level suspension, tend to fix an oscillation axis above the center of gravity of the body; and those restraints and the suspension may be arranged either one, or preferably both, at a high level above the center of gravity. In referring to center of gravity of the car body we mean the substantial or effective center of gravity with whatever load the body may be carrying or intended to carry.

In the preferred form of these inventions, the suspension and control system involves a set or unit of two laterally spaced supporting and controlling elements each mounted below upon the truck or wheel unit without the intervention of any bolster frame or central support in the nature of a swivel. These two supporting and controlling elements are spaced laterally from each other at opposite sides of, and symmetrically with respect to, the longitudinal center of the truck and body. They extend upwardly from the truck or wheel unit, being more or less columnar in nature, and are supportingly and controllingly connected with the body, or some rigid portion of the body, at a level above substantially the level of the body center of gravity. Each of these elements includes a member having a vertically elastic or vertically yielding action by which the load of the body is sprung and by which the body is given the oscillatory freedom necessary for its swinging banking action. And each of these elements also includes articulated members which, connecting with the body at the high level, restrict or restrain lateral translative motion of the body at that high level and consequently fix a high level swinging axis for the body.

In the improved form of suspension and control set out in this present application and in application Ser. No. 194,260, the body-supporting elements, mounted at their lower ends on the truck and supportingly engaging the body at their upper ends, are of such a nature that the body is allowed relative freedoms in all directions by virtue of elastic flexsures of these columnar supporting elements. The supporting units may be illustratively visualized, as hereinafter described, as columnar coiled springs which are free to flex elastically in all directions within certain restraints and restrictions. It is thus one of the characteristics of this improved type of suspension that all the relative body movements take place by elastic flexure of the suspension units or elements and without any relative surface movements between any supporting parts.

In this form of the invention each supporting and controlling unit also has means for restraining and restricting lateral movement of the body at a relatively high level, characteristically at or about the level of the high oscillation axis. That restraint tends to fix the position of the high oscillation axis, and also incidentally tends to restrain and restore the body in both its swinging and swivelling movements, and to localize the swivelling axis.

Finally, relative longitudinal motion, and elastic distortion of the supporting columns, is restrained and preferably very closely restricted, by a draft connection between the truck and the body at a comparatively low level, below the level of body support and oscillation axis and substantially at the level of the truck. In the particular aspect of the invention with which this application deals, the adjacent or abutting ends of two adjacent car bodies are mounted upon a single truck which may be articulate. The draft connection between adjacent cars may be transmitted directly between them or may be transmitted through the truck. In either case the draft connection between the truck and the cars is entirely or substantially entirely through the low level draft connection, which is preferably and illustratively in the form of a longitudinal draft bar, freely flexible in all directions except longitudinally. In a longitudinal direction the draft bar has some yieldability for the absorption of longitudinal shocks; but its structure and action are such that the draft forces which are transmitted through the truck at a low level are transmitted between the truck and the car bodies substantially exclusively through the low level draft connections, and not through the high level suspension and control connections to the body. In speaking of draft and draft connection, we include both positive and negative draft, both pull and thrust, and the connections are constructed to transmit both those draft forces.

Further objects and the corresponding features and accomplishments of the invention will be understood from the following detailed and specific description of illustrative embodiments, reference for the purpose being had to the accompanying drawings, in which:

Fig. 2 is a vertical section taken as indicated by line 2—2 on Fig. 1;

Fig. 3 is a similar section showing the action of the suspension and controlling unit as the car body swings about the high center of oscillation;

Fig. 4 is a plan, with certain parts broken away, taken on line 4—4 of Fig. 1 and showing the truck and the suspension and control elements;

Fig. 5 is an enlarged sectional detail showing the connection of a draft bar with the truck;

Fig. 6 is an enlarged sectional detail showing certain parts of the truck structure;

Figure 1:
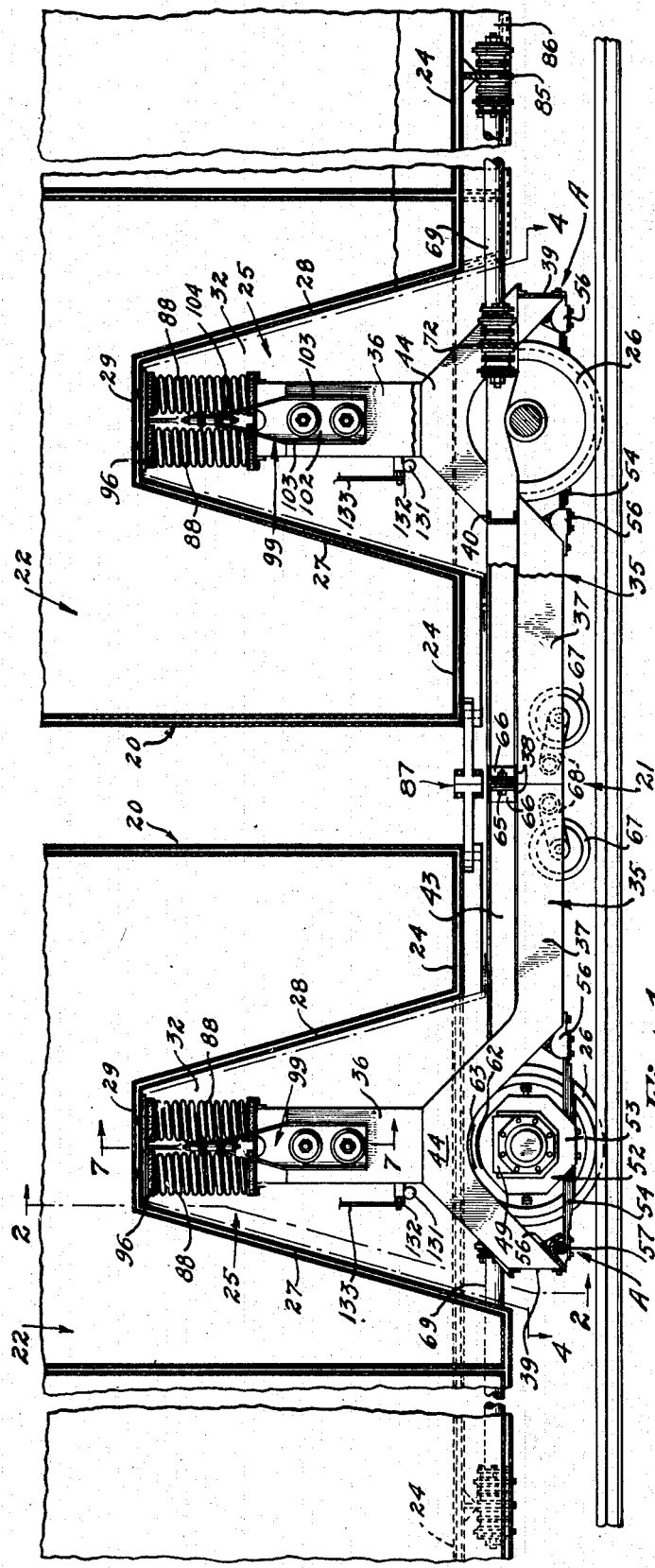
Fig. 1 is a longitudinal vertical section, on line 1—1 of Fig. 2, showing our improved suspension and articulation system typically applied to two adjacent car bodies.

Fig. 7 is an enlarged sectional detail taken as indicated by line 7—7 on Fig. 1, with parts of the supporting spring 88 and its seats broken away to show in section, and Fig. 8 is a sectional detail taken as indicated by line 8—8 on Fig. 7 and showing the action of the suspension and control elements when the suspension element or columns are flexed in a longitudinal direction or in swivelling action.

In the following specification and claims, where the term "substantial movement" is used in connection with the supporting means, it is meant to denote movement of such magnitude as will permit all relative lateral, vertical, longitudinal, and angular movements between the car body and the truck frame required for normal railroad service. The elastic supporting members between the car body and the truck frame—being the sole supporting means for the body—are of such a character as to permit, in and of themselves, through elastic flexure, duplication of all the relative movements provided by a standard swinging-bolster bogie truck in normal railroad service.

Fig. 1 shows fragmentarily an articulated train of cars 20, in which adjacent cars share a common truck 21. It is contemplated that the cars will be constructed entirely of metal, each car body 22 comprising a self-supporting shell 23 having a floor 24.

At each end of the car body is a pair of truck compartments 25, there being a compartment provided above each wheel 26 of the truck 21. Each of the truck compartments 25 has inclined walls 27 and 28, fore and aft, and a top wall 29 well above the level of the center of gravity of the car body, that is indicated on the drawings as C. G. The shell 23 provides the outer walls of the compartments, while the inner walls are provided by wall members 32 that serve not only as walls for the end passages 33 of the car, but also as structural members extending to the roof of the car, acting in combination with walls 27 and 28, to distribute loading into shell 23. These passage walls may be interconnected by an upper horizontal wall 34 to provide further lateral strength. By employing such a construction, we may support the car body by means engaging the walls of the truck compartments 25.

Each truck 21 comprises two separable axle units, generally designated by letter A, each of the axle units serving, in effect, as a cradle for supporting the end of its associated car body. In our preferred construction disclosed herein, each axle unit A includes a lower, substantially horizontal frame, generally designated by numeral 35, and, integral therewith, two columns 36 extending upward into corresponding truck compartments 25 to support the car body. To combine lightness with strength, we prefer to fabricate the axle unit from sheet metal, as indicated by the drawings.

Each of the lower frames 35 includes side members 37 of hollow construction that are interconnected by a channel-shaped cross member 38, a cross member 39 at the opposite end of the frame, and an intermediate channel-shaped cross member 40, the latter two cross members lying fore and aft of the wheels 26 of the axle unit. The frame construction shown also includes internal diagonal braces 42 and a pair of parallel, longitudinally disposed, channel-shaped beams 43 that rest on and are secured to the cross members 38, 39, and 40. Each of the side members 37 is formed with an upwardly offset portion 44 associated with the corresponding wheel 26. As may be understood by referring to Fig. 6, the top wall 45 of each side frame member 37 is extended laterally to provide a base on which the column 36 is mounted at the top of the offset portion 44 of the frame member. At the inner edge of top wall 45 a depending reinforcing skirt 46 is provided, the frame member 37, wall 45, and skirt 46 thus forming a hood extending over the associated wheel 26.

Each pair of wheels 26 is integral with a common axle 47, the opposite ends of which are journaled, in this instance, in ball-bearings 48. The bearings at each end of the axle are housed by a suitable journal box 49, the cover 50 of which is removably secured by cap screws 51. Each journal box 49 is surrounded by an independent journal frame 52 having an integral stirrup 53 through which extends a leaf spring 54, U-shaped clips 55 being employed to secure the spring to the frame 52. Leaf springs 54, on each side of the axle unit, span the offset portions 44 of the corresponding side frame members 37 and may be attached to the side frame members in any suitable manner. In the construction we prefer, each frame member 37 carries rubber-lined concave bearing members 56 (Fig. 1) to receive complementary convex members 57 on each end of each leaf spring.

As means to yieldingly relate the frame 52 to the journal box 49, the top of the journal box may provide a seat 58 (Fig. 6) for an interposed layer 59 of rubber or other resilient material. Such construction permits slight lateral or oscillatory movement of the wheels and axle relative to the axle frame, and serves as shock-absorbing means. To cushion any impact of the journal frame 52 against the overhanging offset portion of the frame member 37, the journal frame may seat a pair of arcuate buffer members 62 of rubber or similar material. Extreme movement of the journal box towards the corresponding frame member 37 brings the buffer members 62 into contact with a complementary arcuate rubber plate 63 mounted on the under side of the frame member.

Normally, the two adjacent horizontal frames 35 of the axle units of adjacent cars are rigidly secured together to provide a unitary frame for a truck 21 shared by the two cars. For example, bolts 65 may extend through clips 66 at the opposed ends of beams 43, or automatic coupling means (not shown) may be employed to interconnect the ends of frame members 37 of the two frames. When two axle units are so interjoined, the resulting truck is a stable construction that will maintain the four columns 36 in a rigid, vertical position. When so interconnected, the units are functionally the same as one integrated truck and are therefore also illustrative of a truck that is not designed to be separated.

When the two axle units are separated, to act independently instead of together as a four-wheel truck, some means must be provided to keep the axle units in proper alinement with the car body. For such purpose small auxiliary wheels 61 may be mounted on the horizontal frame 35 by pivoted arms 68. Normally these wheels are maintained in retracted position, as indicated by the drawings, but whenever the trucks are divided into separate axle units, the wheels are swung downward to engage the rails of the track. Any of the suitable means well known to the art for controlling such auxiliary wheels may be employed. These auxiliary wheels are not needed to support any portion of the load imposed by the car body, but serve solely as guide wheels.

Either one axle unit, or each axle unit, is connected to its associated car by a draft member, preferably a longitudinally disposed member having a longitudinally yielding action. A suggested construction is shown in the drawings, particularly in Figs. 1 and 5. The draw bar 69 has a reduced end 70 that extends through an oversized aperture in a heavy transverse plate 72 that extends between the two beams 43 of the axle unit. The aperture through plate 72 accommodates a suitable rubber collar or spacer ring 73 embracing the reduced end 70 of the draw bar. On either side of the transverse plate 72 the reduced end 70 is embraced by a pair of resilient rings 74 of rubber or other suitable material. To restrain the rings from bulging outwardly under excessive pressure, we provide each of the rings with a pair of metal disks 75 having dished edges partly confining the periphery of the resilient rings.

The series of four resilient rings 74 is confined between two heavy plates 76 and 77. Plate 76 is secured in place by nut 78 and washers 79, while plate 77 is adjustably held in place by cap screws 80 extending through a plate 81 and bearing against washers 82. Plate 81 in turn rests against the annular shoulder 83 of the draw bar. This construction permits not only limited longitudinal movement of the draw bar, but also oscillatory movement, there being yielding resistance to either type of movement away from the normal position shown in Fig. 5. The construction also permits the draw bar 69 to rotate in its connection with the axle unit.

The other end of the draw bar may be connected to the body of the car in any suitable manner. We prefer, however, to employ the same type of yielding connection as above described. For example, as shown in Fig. 1, such a yielding engagement may be made with a suitably apertured transverse plate 85 that is secured between a pair of longitudinal beams 86, extending under the floor 24 of the car body.

For some purposes, as hereinafter pointed out, it is preferable to connect the drawbar to the truck or axle unit at a point near the vertical central axis of the body suspension, to tend to localize the vertical axis of swivelling. That connection point may be varied however, and the direction in which the drawbar extends from that connection point may be other than is here shown. For instance, the drawbar is here shown as extending longitudinally toward the center of the car from the point of truck connection. But its direction may be reversed, so that it extends from the point of truck connection toward the end of the car body.

The two car bodies may or may not be directly interconnected for direct transmission of draft forces between them. In Fig. 1 a draft coupling is indicated at 87 directly coupling the two car bodies; which may or may not be used, as circumstances may require. If such a draft coupling is used, then only one draft connection such as 69 needs to be used to stabilize both car bodies longitudinally with relation to the interconnected or integrated truck, although of course two can be used. If, on the other hand, no draft coupler such as 87 is used between the car bodies, then two draft connections such as 69 are used to stabilize each car longitudinally relative to the truck. And if the truck is made separable, as illustrated, it is desirable in any case to use the two draft connections to stabilize each car body relative to its half truck or axle unit.

Where no direct interconnection is used between the car bodies, all the longitudinal draft forces between adjacent cars are transmitted through the truck and through the low level draft connections 69. Where the inter-body coupler is used, the draft forces between adjacent car bodies are largely transmitted directly between them, or wholly so transmitted if only one draft connection 69 is used. But in any case all the longitudinal draft forces between the truck or wheel units and the bodies are transmitted substantially exclusively through the low level draft connection or connections and without interfering at all with the desired actions of the high level suspension and controlling units. Those units, now to be explained, are substantially entirely free from the effects of draft force transmission.

Our invention is characterized by the utilization of resilient, universally yielding relations at the spaced supporting points, and it will be obvious to those skilled in the art that various yielding arrangements may be employed within the scope of the broad invention. As previously noted, we prefer a certain character of flexibility or elastic flexure between the car body and the truck, preferring greater lateral freedom than longitudinal freedom and greater vertical freedom than lateral freedom, but we do not restrict ourselves to the particular character of such flexibility herein sought nor the particular relationships between the various yielding means employed. Several different forms of means may be utilized to provide the elastic flexure desired between the truck and the car body.

In our preferred construction disclosed herein, we achieve the desirably extensive freedom for relative movement in vertical aspect by simply resting the car body on vertically disposed helical springs mounted on the columns 36 of the axle unit. Preferably, the springs employed are "soft" in the sense that they are designed to have relatively great static deflection under normal load. Relatively long springs are indicated, and length is desirable, also, to permit the springs to be distorted laterally in the turning movement of the truck on curves without exceeding safe stresses in the material of the springs.

The drawings show two helical springs 88 mounted on the top wall 89 of each column 36, the springs being in compression between the top of the column and the top wall 29 of the corresponding truck compartment. A lower resilient seat for each spring is provided by an assembly comprising a resilient pad 90 in the form of a ring made of rubber or like material, and two retaining members for the pad, a flanged metal ring 91 and a flanged disk 92, the assembly being secured to wall 89 by a suitable bolt 93. A similar resilient seat, generally indicated by numeral 94, is shown for the upper end of springs 88 and is secured to the compartment wall 29 by a suitable bolt 95. Since in this arrangement the weight of the car body is supported by the top wall 29 and the truck compartment, a reenforcement plate 96 may be interposed between the supporting springs and the compartment wall 29, the plate having a vertical portion 97 secured to the vertical wall 32.

Springs 88 in the particular form here illustrated and used only with the elements thus far described would be structurally unstable. The addition of laterally acting, yielding means effective between the columns 36 and the car body, however, results in a stable combination in which the vertical and lateral yielding means in normal equilibrium cooperate to hold the car body in normal alinement with its associated wheel unit. One arrangement that may be employed to provide the required laterally acting, yielding means is shown in the drawings, but other means attaining the same end will readily occur to those skilled in this art. In fact, the desired lateral restraint may be accomplished by proper design of the elastic properties of the supporting springs and their positioning, but, in order to obtain the greatest degree of flexibility in the supporting springs, it is desirable to keep separate the functions of vertical support and lateral restraint by by the use of auxiliary restraining means.

The preferred construction includes an arm 99 yieldingly mounted on the outer wall 100 of each column 36 and a tension member, or link, 101 connected by universal joints with the end of the arm and with the wall 32 of the car body. An arm of the required characteristics may have a central web 102 and marginal ribs 103 that extend above the uppermost edge of the web and converge to form an end portion 104. Each arm is mounted to the wall 100 by means of spaced bolts 105 extending through oversized apertures 106 in the web 102 of the arm, the apertures being oversized to permit oscillation of the arm. Embracing the bolts 105 between the wall 100 and the web 102, is a circular cushion 107 of rubber, or similar material, of sufficient thickness to hold the arm in spaced relationship to the wall 100. By preference a flanged metal washer 108 is interposed between cushion 107 and the wall 100. Also embracing each bolt 105 against the outer face of the web 102 is a similar rubber cushion 109 with a similar associated metal washer 110. Finally, at the outer end of each bolt 105 is a retaining washer 111 secured by a nut 112.

The universal joint between the arm 99 and the link 101 is provided by a socket member 113 at the end of the link, and a complementary ball member 114 integral with a bolt 115 extending upward through the end portion 104 of the arm. A suitable helical spring 118 and retaining disk 119 mounted on the bolt 115 between the end of the arm and the end of the link tend to minimize clearance or play of the ball in the socket. In similar manner the universal joint between the link 101 and the car body may be provided by a socket member 120 at the end of the link and a complementary ball member 121 on a bolt 122; the bolt extending through a lug 123 formed in the vertical portion 97 of reenforcement plate 96. Mounted on the bolt is a small helical spring 124 and a retaining disk 125 serving the same purpose as spring 118 and disk 119. Links 101 serve to restrain lateral movements of the car body at the level of their attachment and also focus the motion of the car body about a banking axis longitudinally of the car and above the center of gravity, as indicated at b. a. in Figs. 2 and 3. Furthermore, as will be explained, they tend to localize the vertical swivelling axis at a central point between them and between the elastic supporting columns, and to restrain and restore the swinging and swivelling movements.

While in this instance it is preferable to mount the arms 99 and connect links 101, as shown in Figs. 2 and 8, to cause the car to bank about an axis above its center of gravity, it is to be understood that for certain purposes arms 99 may be so mounted as to connect links 101 to the car body at other points, either above or below springs 88.

In addition to the cushioned arms 99 and links 101, adjustable shock-absorbing and cushioning means may be provided to check or retard the banking movements of the body relative to the wheel unit frame. Such means may consist of shock-absorbing elements 126, of any of the well-known types, mounted on plates 127 secured to the top faces 128 of the columns 36 and connected through the medium of arms 129 and links 130 to the upper ends of arms 99. Similar means may also be provided to cushion or check the vertical oscillations of the wheel unit frame relative to the body. Shock-absorbing elements 131 may be secured to side walls of columns 36 and connected by arms 132 and links 133 to top walls 29. These checks act vertically in parallel with springs 88 and prevent objectionable body oscillation on these springs at resonant frequency. They also check the swinging oscillation of the body. Similar means may also be provided for springs 54.

It is important that the functions of the two arms 99 and the associated links 101 be understood, especially in the aspect of yielding means cooperating with the load-bearing springs 88. In normal straight line travel, the laterally-acting yielding means hold the car body centrally on the load-bearing springs, and, at the same time, act as a cushioning means for fleeting, laterally-directed forces between the car body and its associated axle units, and they act at all times yieldingly to restrain lateral movement of the car body at their level and thereby to force the body to swing pendulously about the axis b. a. at or near that level. When the car turns a curve at sufficient speed to cause the body to swing, as heretofore described, the links 101 are thrown out of normal coaxial alinement both by the swinging action of the car body, as indicated in Fig. 3, and by the rotation of the truck, as indicated by Fig. 8. Such departure from normal alinement of the links is resisted by the compression of the upper rubber pad 107 and the lower rubber pad 109 associated with each arm 99, as may be understood by reference to Fig. 3. As a result of the increased tension of the links 101 and increased compression of the rubber pads, the tilting of the car body is resisted to some extent and a desirable degree of restraint is also presented to the swivelling movements of the truck out of normal alinement. This construction has the function of restricting the swivelling movements of each wheel unit, or of each car with respect to the truck, to a close approximation to rotation about a vertical axis centrally of the wheel unit and the supporting unit.

We have, in effect, a three-point connection between each car body and the truck, in which are incorporated diversely disposed yielding means cooperating to take care of all relative movement between the car body and the truck in a manner conducive of maximum stability and riding comfort. The yielding connections between the columns 36 of the axle unit and the car body are not operative through elastic flexure to restrain to the required extent relative movement of the car body longitudinally. But restraint is provided, however, by the draw bar 69 associated with each axle unit without interfering with universality of the yielding action at the elevated support points, within the limits of motion required in railroad service. It is important to note, as features and objects of our invention, that the desirably restrained character of the yielding action through the draft bars does not conflict with the required universal freedom at the support points, because the draft bar is connected to the axle unit near the central, vertical axis of the wheel and supporting units, and that such draft connection acting at the lower level cooperates with the links acting at the higher level to fix that axis, whereby the components of relative movement at one laterally spaced support point, considered with respect to a horizontal plane, are balanced by similar and opposite components of movement at the other support point. All the longitudinal draft forces, positive and negative, are transmitted between the truck or wheel unit and the car body exclusively at the low level of the truck and without interfering at all with the desired actions of the supporting and controlling units. Those units are entirely free from the effects of draft force transmissions.

A virtue of this particular method of floating a car body on its wheel unit is that we obtain the well-known advantage of employing "soft" supporting springs but avoid the undesirable type of rolling or swaying that inevitably results from using relatively long, soft springs in the conventional body suspensions of the prior art.

Forces acting between the car body and the axle unit that are predominantly vertical are resisted by the load-bearing springs 88 in a manner conducive to the comfort of the passengers, the smaller, more fleeting forces being dissipated, the larger and more enduring forces being accommodated by smooth transitions of the car body. An advantage peculiar to this type of floating suspension is the manner in which the car negotiates a curve at high speed. The centrifugal force occasioned by the change in direction being exerted laterally on the center of gravity of the car below the points of support causes the car to swing outwardly at the bottom, or, in effect, to lean inwardly at the top, as indicated by Fig. 3. Simultaneously, the curve in the track rotates the trucks associated with the car body out of a normal alinement with the body. The load-bearing springs are readily distorted to permit this turning movement without losing their ability to support the load of the car body.

While our disclosure has been of a detailed and specific nature, it is to be understood that the principles are broadly applicable to various types of vehicles, and it will be recognized by those skilled in the art that a wide range of substitutes and alterations may be made without departing from the spirit of our invention. We reserve the right to all such changes and substitutions within the purview of our appended claims.

We claim:

1. In an articulated vehicle construction, in combination with two vehicle bodies and a truck common to and positioned under adjacent ends of the two bodies; two body supporting units associated with the truck and each independently supporting a respective body on the truck, each supporting unit being universally elastically flexible, supported at its lower end on the truck and supportingly engaging the body at its upper end, so as to allow the body universal movement relative to the truck by reason solely of elastic flexures of the supporting unit; means for controlling lateral movements of each body and for localizing a longitudinal center of oscillation, each said means being connected between the truck and body and applying opposed yielding restoring forces in substantially horizontal transverse directions to the body at a level above its substantial center of gravity; and mutually independent longitudinal draft connections, between the truck and the respective bodies, each comprising a connector independent of the respective supporting unit and the controlling means and located exclusively at substantially the level of the truck and below the levels of support and lateral control, and having flexibility vertically, laterally and torsionally about a longitudinal axis.

2. In an articulated vehicle construction, in combination with two vehicle bodies and a truck common to and positioned under adjacent ends of the two bodies; two body supporting units associated with the truck and each independently supporting a respective body on the truck, each supporting unit being universally elastically flexible, supported at its lower end on the truck and supportingly engaging a rigid part of the body at a level above the substantial center of gravity of the body, so as to allow the body universal movement relative to the truck by reason solely of elastic flexures of the supporting unit; means for controlling lateral movements of each body and for localizing a longitudinal center of oscillation, each said means being connected between the truck and body and applying opposed yielding restoring forces in substantially horizontal transverse directions to the body at a level above its substantial center of gravity; and mutually independent longitudinal draft connections, between the truck and the respective bodies, each comprising a connector independent of the respective supporting unit and the controlling means and located exclusively at substantially the level of the truck and below the levels of support and lateral control, and having flexibility vertically, laterally and torsionally about a longitudinal axis.

3. In an articulated vehicle construction, in combination with two vehicle bodies and a truck common to and positioned under adjacent ends of the two bodies; two body supporting units associated with the truck and each independently supporting a respective body on the truck, each supporting unit being universally elastically flexible, supported at its lower end on the truck and supportingly engaging the body at its upper end, so as to allow the body universal movement relative to the truck by reason solely of elastic flexures of the supporting unit; means for controlling lateral movements of each body and for localizing a longitudinal center of oscillation, each said means being connected between the truck and body and applying opposed yielding restoring forces in substantially horizontal transverse directions to the body at a level above its substantial center of gravity; and mutually independent longitudinal draft connections, between the truck and the respective bodies, each comprising a connector independent of the respective supporting unit and the controlling means and located exclusively at substantially the level of the truck and below the levels of support and lateral control, and having flexibility vertically, laterally and torsionally about a longitudinal axis; and each connector having a horizontally flexible connection with the truck at a point near the vertical center line of the supporting unit.

4. In an articulated vehicle construction, in combination with two vehicle bodies and a truck common to and positioned under adjacent ends of the two bodies; two body supporting units associated with the truck and each independently supporting a respective body on the truck, each supporting unit being universally elastically flexible, supported at its lower end on the truck and supportingly engaging the body at its upper end, so as to allow the body universal movement relative to the truck by reason solely of elastic flexures of the supporting unit; means for controlling relative swivelling movements of each body and and truck and localizing a vertical central swivelling axis, each said means embodying two substantially horizontally extending yielding tension links respectively having one end pivotally connected with the body at points located in laterally spaced symmetry at opposite sides of the swivelling axis, said links extending oppositely from said connection points and pivotally connected to the truck at their other ends, and exerting tension forces on the body in opposite directions at their body connection points; and mutually independent longitudinal draft connections between the truck and the respective bodies, each comprising a connector independent of the respective supporting unit and the controlling means and located exclusively at substantially the level of the truck and below the level of support, each connector being universally flexible and having a horizontally flexible connection with the truck at a point near the vertical center line of the supporting unit.

5. In an articulated vehicle construction, in combination with two vehicle bodies and a truck common to and positioned under adjacent ends of the two bodies; two body supporting units associated with the truck and each independently supporting a respective body on the truck, each supporting unit comprising a pair of universally elastic columns spaced laterally and symmetrically with reference to the longitudinal center line of the body, said columns having their lower ends supported by the truck and supportingly engaging a rigid part of the body at their upper ends at a level above the substantial center of gravity of the body, to allow the body universal movement relative to the truck by reason solely of elastic flexures of the columns; means for controlling lateral movements of each body and for localizing a longitudinal center of oscillation, each said means being connected between the truck and body and applying opposed yielding restoring forces in substantially horizontal transverse directions to the body at a level above substantial center of gravity; and mutually independent longitudinal draft connections, between the truck and the respective bodies, each comprising a connector independent of the respective supporting unit and the controlling means and located exclusively at substantially the level of the truck and below the levels of support and lateral control, and having flexibility vertically, laterally and torsionally about a longitudinal axis.

6. In an articulated vehicle construction, in combination with two vehicle bodies and a draft transmitting truck common to and positioned under adjacent ends of the two bodies; two body supporting units associated with the truck and each independently supporting a respective body on the truck, each supporting unit being universally elastically flexible, supported at its lower end on the truck and supportingly engaging the body at its upper end, so as to allow the body universal movement relative to the truck by reason solely of elastic flexures of the supporting unit; and mutually independent connections forming the exclusive longitudinal draft connections between the truck and the respective bodies, each comprising a connector independent of the respective supporting unit and located exclusively at substantially the level of the truck and below the level of support engagement of the body, having flexibility vertically, laterally and torsionally about a longitudinal axis, and having a horizontally flexible connection with the truck at a point near the vertical center line of the supporting unit.

7. In an articulated vehicle construction, in combination with two vehicle bodies and a draft transmitting truck common to and positioned under adjacent ends of the two bodies; two body supporting units associated with the truck and each independently supporting a respective body on the truck, each supporting unit comprising a pair of universally elastic columns spaced laterally and symmetrically with reference to the longitudinal center line of the body, said columns having their lower ends supported by the truck and supportingly engaging a rigid part of the body at their upper ends at a level above its substantial center of gravity, to allow the body universal movement relative to the truck by reason solely of elastic flexures of the columns; and mutually independent connections forming the exclusive longitudinal draft connections between the truck and the respective bodies, each comprising a connector independent of the respective supporting unit and located exclusively at substantially the level of the truck and below the level of support engagement of the body, having flexibility vertically, laterally and torsionally about a longitudinal axis, and having a horizontally flexible connection with the truck at a point near the vertical center line of the supporting unit.

8. In an articulated vehicle construction, in combination with two vehicle bodies and a draft transmitting truck common to and positioned under adjacent ends of the two bodies; two body-supporting units associated with the truck and each independently supporting a respective body on the truck, each supporting unit including an elastically flexible body supporting element supported by the truck, extending upwardly, and supporting the body at its upper end by support engagement with a rigid part of the body at a level above its substantial center of gravity, said element having universal elastic flexibilities within its length between its wheel unit support and its body engagement, and being substantially unconfined as regards universal flexures, so as to allow the body corresponding elastically opposed universal freedom with respect to the wheel unit by virtue substantially solely of said elastic flexures; and mutually independent longitudinal draft connections between the truck and the respective bodies, each comprising a connector independent of the respective supporting unit and located exclusively at substantially the level of the truck and below the level of body support, and having flexibility vertically, laterally and torsionally about a longitudinal axis.

9. In an articulated vehicle construction, in combination with two vehicle bodies and a draft transmitting truck common to and positioned under adjacent ends of the two bodies; two body supporting units associated with the truck and each independently supporting a respective body on the truck, each supporting unit being universally elastically flexible, supported at its lower end on the truck and supportingly engaging the body at its upper end, so as to allow the body universal movement relative to the truck by reason solely of elastic flexures of the supporting unit; and mutually independent connections forming the exclusive longitudinal draft connections between the truck and the respective bodies, each comprising a connector independent of the respective supporting unit and located exclusively at substantially the level of the truck and below the level of support engagement of the body, having flexibility vertically, laterally and torsionally about a longitudinal axis.

10. In an articulated vehicle construction, in combination with two vehicle bodies and a draft transmitting truck common to and positioned under adjacent ends of the two bodies; two body supporting units associated with the truck and each independently supporting a respective body on the truck, each supporting unit comprising a pair of universally elastic columns spaced laterally and symmetrically with reference to the longitudinal center line of the body, said columns having their lower ends supported by the truck and supportingly engaging a rigid part of the body at their upper ends at a level above its substantial center of gravity, to allow the body universal movement relative to the truck by reason solely of elastic flexures of the columns; and mutually independent connections forming the exclusive longitudinal draft connections between the truck and the respective bodies, each comprising a connector independent of the respective supporting unit and located exclusively at substantially the level of the truck and below the level of support engagement of the body, having flexibility vertically, laterally and torsionally about a longitudinal axis.

WILLIAM E. VAN DORN.
PAUL K. BEEMER.